(12) United States Patent
Kawachi

(10) Patent No.: US 7,821,537 B2
(45) Date of Patent: Oct. 26, 2010

(54) SIGNAL PROCESSING APPARATUS

(75) Inventor: Shuhei Kawachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1324 days.

(21) Appl. No.: 10/896,259

(22) Filed: Jul. 21, 2004

(65) Prior Publication Data

US 2005/0024505 A1 Feb. 3, 2005

(30) Foreign Application Priority Data

Aug. 1, 2003 (JP) .............................. 2003-205384

(51) Int. Cl.
  *H04N 5/225* (2006.01)
  *H04N 5/76* (2006.01)
(52) U.S. Cl. .................. 348/207.1; 348/231.4
(58) Field of Classification Search ................. 348/515, 348/231.4, 207.1; 700/94; 710/52–56
  See application file for complete search history.

(56) References Cited

U.S. PATENT DOCUMENTS

| | | | | |
|---|---|---|---|---|
| 5,515,430 A | * | 5/1996 | Ozawa et al. ................ 379/350 |
| 5,583,791 A | * | 12/1996 | Harigaya et al. ............. 348/575 |
| 6,452,974 B1 | * | 9/2002 | Menon et al. ........... 375/240.28 |
| 6,720,998 B1 | * | 4/2004 | Kim .......................... 348/220.1 |
| 6,753,921 B1 | * | 6/2004 | Shimizu ..................... 348/372 |
| 6,868,096 B1 | * | 3/2005 | Hayashi ...................... 370/535 |
| 6,897,891 B2 | * | 5/2005 | Itsukaichi .................. 348/14.1 |
| 7,071,967 B2 | * | 7/2006 | Hwang ..................... 348/207.1 |
| 2002/0054212 A1 | * | 5/2002 | Fukuoka ..................... 348/207 |
| 2004/0090533 A1 | * | 5/2004 | Dow et al. ............... 348/220.1 |
| 2005/0243190 A1 | * | 11/2005 | Ogikubo ................. 348/231.99 |
| 2006/0061671 A1 | * | 3/2006 | Kitsugi et al. .......... 348/231.99 |

* cited by examiner

*Primary Examiner*—Timothy J Henn
(74) *Attorney, Agent, or Firm*—Cowan, Liebowitz & Latman, P.C.

(57) ABSTRACT

A signal processing apparatus includes: a write controller for writing an input moving image signal into a first memory in accordance with a first timing signal and writing an input audio signal into a second memory in accordance with the first timing signal; a communication unit for reading out the moving image signal from the first memory in accordance with the first timing signal, reading out the audio signal from the second memory in accordance with a second timing signal having a frequency different from that of the first timing signal, and transmitting the read-out moving image signal and the read-out audio signal to an external device; and a read-out controller for changing a read-out position of the audio signal to a predetermined read-out position to be determined according to a write position of the audio signal, in case that a difference between the write position and the read-out position of the audio signal is a predetermined value.

12 Claims, 19 Drawing Sheets

FIG. 3

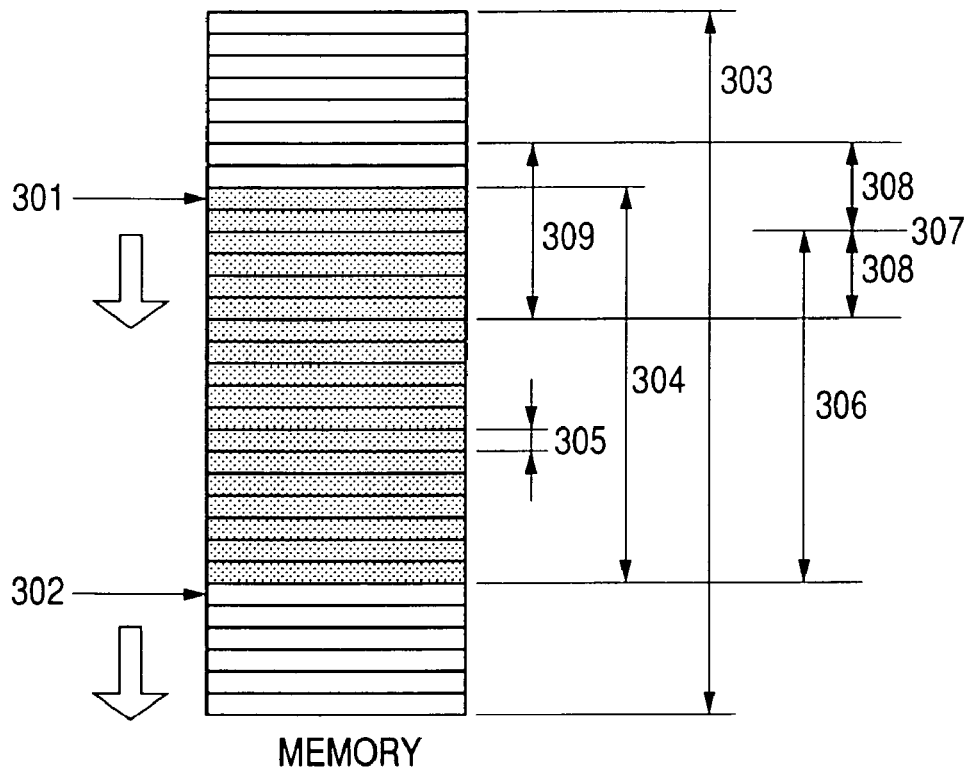

MEMORY

301 DATA READ-OUT POSITION r
302 DATA WRITE POSITION w
303 ENTIRE BUFFER AREA
304 DATA AMOUNT a SUBJECTED TO BUFFERING
305 DATA AMOUNT TO BE TRANSMITTED AT A TIME
306 IDEAL VALUE a' OF DATA AMOUNT SUBJECTED TO BUFFERING
307 IDEAL DATA READ-OUT POSITION r'
308 ALLOWABLE DEVIATION AMOUNT a FROM IDEAL VALUE a' OF DATA AMOUNT a SUBJECTED TO BUFFERING
309 ALLOWABLE RANGE D OF DATA READ-OUT POSITION

MEMORY

701 DATA READ-OUT POSITION r
702 DATA WRITE POSITION w
703 ENTIRE BUFFER AREA
704 DATA AMOUNT a SUBJECTED TO BUFFERING
705 DATA AMOUNT TO BE TRANSMITTED AT A TIME
706 IDEAL VALUE a' OF DATA AMOUNT SUBJECTED TO BUFFERING
707 IDEAL DATA READ-OUT POSITION r'

SIGNAL PROCESSING APPARATUS

This application claims priority from Japanese Patent Application No. 2003-205384 filed on Aug. 1, 2003, which is hereby incorporated by reference herein.

BACKGROUND OF THE INVENTION

1. Field of the Invention

The present invention relates to a signal processing apparatus, and more particularly to an apparatus for transmitting image data and audio data after storing temporarily the image data and the audio data in a memory.

2. Related Background Art

Recently, the development of a computer interface for connecting a personal computer (hereinafter referred to as a PC) and peripheral equipment has advanced, and Universal Serial Bus (USB), Institute of Electrical and Electronic Engineers (IEEE) 1394 and the like have been frequently used as typical bus standards.

These computer interfaces are used for transferring digital data of a still image, a moving image and the like, all recorded by a digital camera or a digital video camera into a storing medium such as a memory card. Moreover, the above-mentioned interfaces have lately begun to be used for streaming, in which images and sound from a storing medium such as a charge coupled device (CCD) or a tape are reproduced while being transferred to a PC side, in addition to the transfers of a still image file and a moving image file, both stored in the storage medium.

A video class interface is generally used for the streaming in accordance with USB. The video class interface is prescribed in a specification of "Universal Serial Bus Device Class Definition for Video Devices". There are Motion Joint Photographic Experts Group (MJPEG), a digital video (DV) format, Moving Picture Experts Group (MPEG) and the like as the formats of images the transfer methods of which are prescribed.

Moreover, when streaming is performed by means of the video class interface, both of an isochronous transfer and a bulk transfer can be used. However, for keeping the continuity of images and sounds and for producing a situation in which a PC can easily identify the timing of a frame change of images, the isochronous transfer is generally used.

In case that the MJPEG format is selected as a subtype (or a moving image transferring format in a video class interface), an audio class interface is used independently of the video class interface when streaming in which audio data is added to images is performed, because the transfer of sounds is not prescribed by the video class interface. In the following, the data transfers of the video class and the audio class, both used for streaming in accordance with the MJPEG format, will be described.

First, an audio data transfer in the USB audio class is described.

In an asynchronous transfer, a data transfer is performed in synchronization with a start of frame (SOF), which is transmitted from a USB host to a device at a fixed period. In the audio class, a camera side is required to surely transmit a fixed amount of data at every reception of a data transmission request, which is transmitted from a PC at a fixed interval on the basis of an SOF.

The data transmission request from the PC is based on a clock on the PC side. On the other hand, the camera side produces audio data on the basis of a clock generated by the camera side itself in place of the clock of the PC. When the frequencies of both of the clocks are quite the same, there are no problems. Actually, an error surely exists between them. Consequently, the amount of data generated per unit time on the camera side and the amount of data read per unit time by the PC differ from each other slightly.

The data to be transferred at the time of streaming is buffered by an audio storing memory for a fixed period of time. Owing to the error between the writing clock and the reading clock, an interval between a data write position and a data read-out position in the audio storing memory changes in proportion to the elapse of the time of the streaming. When the interval is out of a fixed range, a buffer overrun or a buffer underrun occurs, and transfer data breaks down.

Next, a moving image data transfer in the USB video class is described.

Also in the USB video class, the PC transmits a data transmission request to the camera side at a fixed interval on the basis of an SOF similarly to the case of the audio class. However, differently from the case of the audio class, the amount of the data to be transmitted is adjusted to the clock on the camera side.

FIG. 19 is a view showing the transfer timing of video data. Data transmission requests from the PC are based on an SOF, and are always transmitted to the camera side at a fixed period. On the other hand, the camera side which received the transmission requests does not always transmit video data but transmits video data of one frame upon receiving a clock generated at every frame by the camera side itself. It is sufficient for the PC side to update a display frame at every new reception of video data of one frame. By this method, the buffer overrun and the buffer underrun do not occur in the video data storing memory of the camera side.

Until now, the transfers in accordance with the audio class and the video class in the USB have been severally described. In the following, the streaming of a sound and a moving image in a class formed by the combination of the aforementioned two classes will be described.

At the time of performing the streaming of a moving image and a sound in a digital video camera or the like, a moving image pickup apparatus for generating moving image data and an audio pickup apparatus for generating audio data are severally driven by clocks different from each other.

Generally, a digital video camera is equipped with a mechanism for preventing deviation in synchronization between an image and a sound, which deviation is caused by using different clocks to generate an image and a sound respectively.

However, in the case where the USB video class is used for the transfer of moving image data and the USB audio class is used for the transfer of audio data at the time of streaming, the moving image data and the audio data are transferred in accordance with different methods. Consequently, a problem of the deviation in synchronization occurs.

That is, as described above, the amount of the data to be transferred is determined on the basis of the clock on the PC side in the USB audio class. On the other hand, the amount of the data is determined on the basis of the clock on the camera side in the USB video class. Consequently, a phenomenon in which a sounds runs too fast or too late against an image occurs owing to an error between the both clocks. Moreover, the deviation becomes larger as time elapses, and at last the above-mentioned overrun or the underrun of the audio data storing buffer occur to break down the streaming.

A technique related to the above-mentioned problem is described in Japanese Patent Application Laid-Open No. 2000-21081.

The invention described in the Japanese patent application adopts the following method. That is, a host (PC) and a device (camera) count the number of clocks generated between continuous two synchronization signals (SOF) and the number of received data, and feed back the counted numbers to determine the transmission amount of data.

However, such a method has a problem that processing is complicated.

SUMMARY OF THE INVENTION

The present invention aims to solve such problems.

Another object of the present invention is to correct a synchronous deviation between audio data and moving image data, which deviation is caused at the time of streaming of a sound and a moving image.

For achieving such objects, according to an aspect of the present invention, a signal processing apparatus of the invention includes: input means for inputting a moving image signal and an audio signal corresponding to the moving image signal; first storing means; second storing means; write control means for writing the moving image signal into the first storing means in accordance with a first timing signal and writing the audio signal into the second storing means in accordance with the first timing signal; communication means for reading out the moving image signal from the first storing means in accordance with the first timing signal, reading out the audio signal from the second storing means in accordance with a second timing signal having a frequency different from that of the first timing signal, and transmitting the read-out moving image signal and the read-out audio signal to an external device through a transmission path; and read-out control means for changing a read-out position of the audio signal to a predetermined read-out position to be determined according to a write position of the audio signal, in case that a difference between the write position and the read-out position of the audio signal in the second storing means reaches a predetermined value.

The further objects and the features of the present invention other than the ones described above will be apparent on the basis of the detailed description of the preferred embodiments of the invention in the following with the attached drawings being referred to.

BRIEF DESCRIPTION OF THE DRAWINGS

FIG. 3 is a view showing the state of the buffering of audio data;

DETAILED DESCRIPTION OF THE PREFERRED EMBODIMENTS

Embodiment 1

In the following, a first embodiment of the present invention will be described. In the present embodiment, the present invention is applied to a case where moving image data and audio data both captured by a digital video camera are transferred to a PC connected to the video camera with a USB while the PC side reproduces received data.

Figure 1:
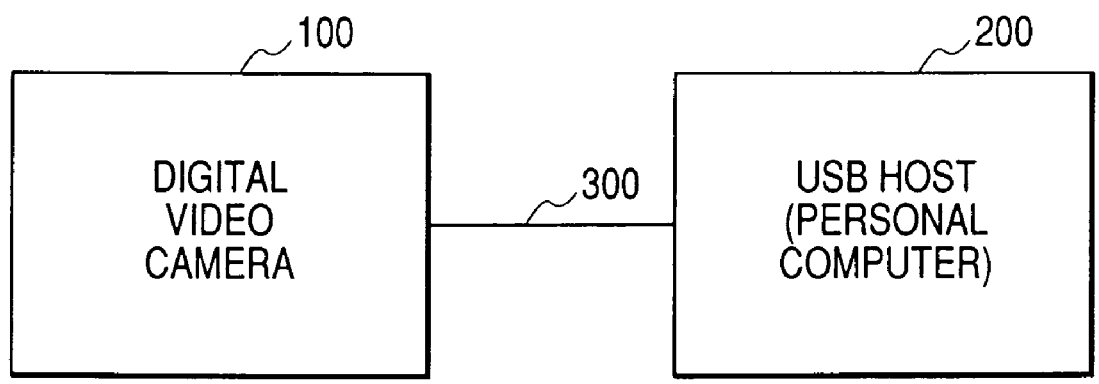
FIG. 1 is a view showing a connection between a digital video camera and a PC to which the present invention is applied.

As shown in FIG. 1, a USB host (PC) 200 and a digital video camera 100 equipped with a USB terminal are connected to each other with a USB cable. Video data and audio data, both obtained by the digital video camera 100, are transferred to the USB host (PC) 200 through the USB cable and reproduced by the USB host (PC) 200. Incidentally, the USB video class and the USB audio class are used for transferring moving image data and audio data, respectively.

Figure 2:
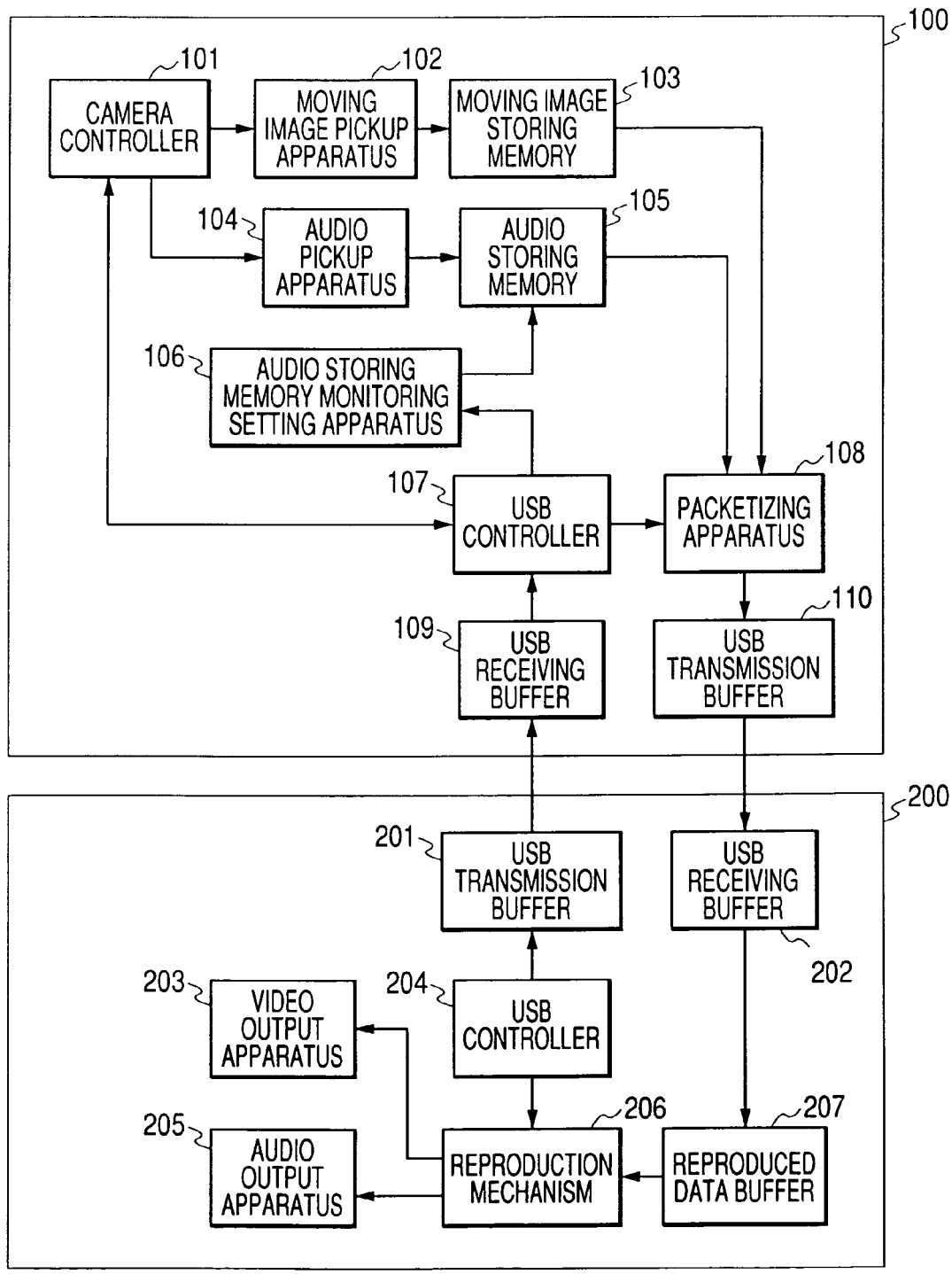
FIG. 2 is a block diagram showing a configuration of the digital video camera and the PC, to which the present invention is applied.

FIG. 2 is a view showing the system configuration of the digital video camera 100 and the USB host (PC) 200.

The digital video camera 100 includes a camera controller 101, a moving image pickup apparatus 102, a moving image storing memory 103, an audio pickup apparatus 104, an audio storing memory 105, an audio storing memory monitoring setting apparatus 106, a USB controller 107, a packetizing apparatus 108, a USB receiving buffer 109 and a USB transmission buffer 110.

The camera controller 101 supplies operation clocks to the moving image pickup apparatus 102 and the audio pickup apparatus 104 to operate them at suitable timing.

The moving image pickup apparatus 102 converts an object image to digital data in accordance with an instruction received from the camera controller 101 and writes the converted digital data into the moving image storing memory 103. The audio pickup apparatus 104 samples sounds in accordance with an instruction received from the camera controller 101 and writes the sampled sounds as digital data into the audio storing memory 105.

The moving image storing memory 103 and the audio storing memory 105 are severally a ring buffer of the first-in and first-out system, and each buffers moving image or audio data for a fixed period of time.

The packetizing apparatus 108 reads out moving image data from the moving image storing memory 103 in accordance with an instruction received from the USB controller 107 and divides the read-out moving image data into USB packets to store the USB packets into the USB transmission buffer 110. Moreover, the packetizing apparatus 108 similarly reads out audio data from the audio storing memory 105 and divides the read-out audio data into USB packets to store the USB packets into the USB transmission buffer 110.

The USB controller 107 stores the moving image data stored in the moving image storing memory 103 and the audio data stored in the audio storing memory 105 into the USB transmission buffer 110 by issuing an instruction to the packetizing apparatus 108 at the time of receiving a data transmission request from the USB host 200 though the USB receiving buffer 109, and informs the audio storing memory monitoring setting apparatus 106 of the reception of the data transmission request.

On the other hand, the USB host (PC) 200 includes a USB transmission buffer 201, a USB receiving buffer 202, a USB controller 204, a reproduced data buffer 207, a reproduction mechanism 206, a video output apparatus 203 and an audio output apparatus 205.

The USB controller 204 is arranged to supply clocks for a streaming operation of the USB host 200. The USB controller 204 stores a data transmission request into the USB transmission buffer 201 at a fixed time interval and supplies reproduction timing to the reproduction mechanism 206.

The USB transmission buffer 201 transmits the data transfer requests stored by the USB controller 204 to the digital video camera 100. The USB receiving buffer 202 stores the reception data received from the digital video camera 100 into the reproduced data buffer 207. The reproduced data buffer 207 is of the first-in and first-out system and stores reproduced data for a fixed period of time. The reproduction mechanism 206 receives a clock from the USB controller 204, and then reads out reproduction data from the reproduced data buffer 207 to convert the read-out reproduction data into a video signal and an audio signal. The reproduction mechanism 206 then outputs the converted video signal and the audio signal to the video output apparatus 203 and the audio output apparatus 205, respectively. The video output apparatus 203 outputs the video signal received from the reproduction mechanism 206 as an image. The audio output apparatus 205 outputs the audio signal received from the reproduction mechanism 206 as a sound.

In the following, the operation of the audio storing memory monitoring setting apparatus 106 will be described.

Figure 4:
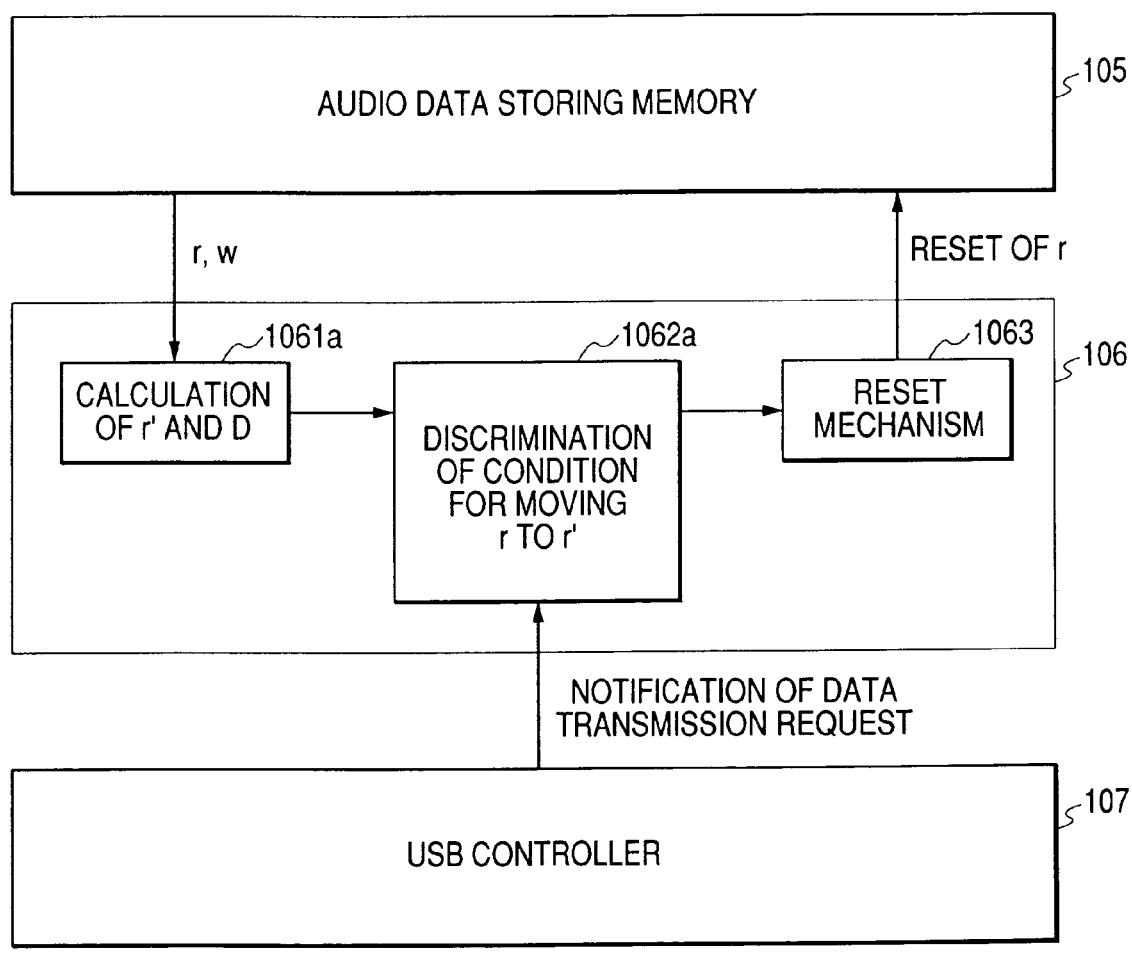
FIG. 4 is a view showing a configuration for the control of an audio storing memory.

FIG. 4 is a view showing the surrounding configuration of the audio storing memory 105.

The audio storing memory 105 is of the ring buffer system and holds a data read-out position (address) r and a data write position w in a fixed memory area. At the time of data writing, subject data is written at the data write position w, and the data write position is shifted backward. Moreover, at the time of data reading, data is read out from the data read-out position r, and the data read-out position r is shifted backward.

When both of the data write position w and the data read-out position r reach the rearmost position of the memory area, the data write position w and the data read-out position r are returned to the top of the memory area.

The above-mentioned circulations of the data write position w and the data read-out position r in the fixed memory area realizes the buffer of the first-in and first-out system.

In the present embodiment, as shown in FIG. 3, the data read-out position r is moved to an ideal data read-out position r' at the point of time when the magnitude of the deviation of the data read-out position r from the ideal data read-out position r' in the audio storing memory 105, which deviation is caused by an error between the clocks of the digital video camera 100 and the USB host (PC) 200, exceeds an allowable deviation amount α.

FIG. 3 is a view showing a state of data in the audio storing memory 105. The ideal read-out position r' in the audio storing memory 105 can be determined on the basis of an ideal value a' of the data amount subjected to buffering by the audio storing memory 105.

For preventing the occurrence of any synchronous deviations of sounds and dynamic images at the time of streaming, it is necessary to keep the amount of the audio data buffered by the audio storing memory 105 to be constant. Consequently, the ideal value a' of the audio data amount to be buffered is to be the data amount subjected to buffering at the time of a start of streaming. When the data read-out position r and a data write position w are known, the data amount a subjected to buffering can be obtained. Conversely, an ideal data read-out position r' can be determined to the present data write position w on the basis of the ideal value a' of data amount to be subjected to buffering.

Figure 5:
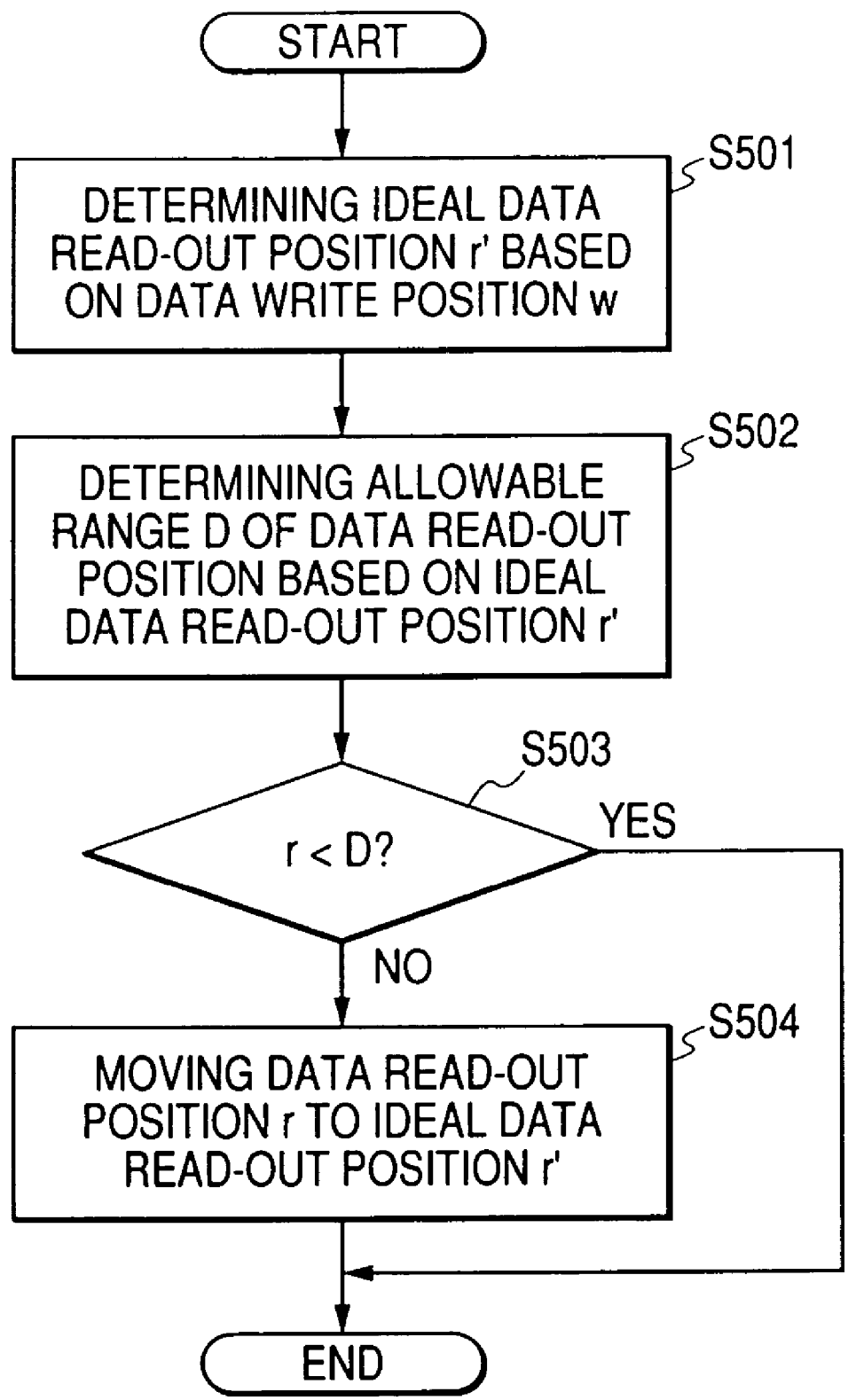
FIG. 5 is a flowchart showing the read-out control of audio data.

That is, when the audio storing memory monitoring setting apparatus 106 is informed of a reception of data transmission request from the USB controller 107, the audio storing memory monitoring setting apparatus 106 executes the processing shown in the flowchart of FIG. 5.

First, on the basis of the present data write position w, the audio storing memory monitoring setting apparatus 106 determines an ideal data read-out position r' of the case where only the ideal value a' of the data amount to be subjected to buffering is buffered (step S501). Next, the audio storing memory monitoring setting apparatus 106 determines an allowable range D of data reading on the basis of the ideal data read-out position r' and a fixed range a (step S502). Then, the audio storing memory monitoring setting apparatus 106 judges whether the read-out position r is within the allowable range D or not (step S503). When the read-out position r does not exist within the allowable range D, the audio storing memory monitoring setting apparatus 106 moves the data read-out position r to the ideal data read-out position r' (step S504).

As described above, according to the present embodiment, when the read-out position in the audio storing memory 105 is shifted to exceed the predetermined allowable range D from the ideal read-out position, the read-out position is forcibly moved to the ideal read-out position. Consequently, the breakdown of data owing to an error between the writing clock and the reading clock can be prevented.

Embodiment 2

Next, a second embodiment will be described.

The first embodiment adopts a method of correcting the data read-out position when the data read-out position in the audio storing memory is out of the allowable range. The present embodiment corrects the data read-out position synchronously to a timing of some trigger from an external connection destination.

Figure 6:
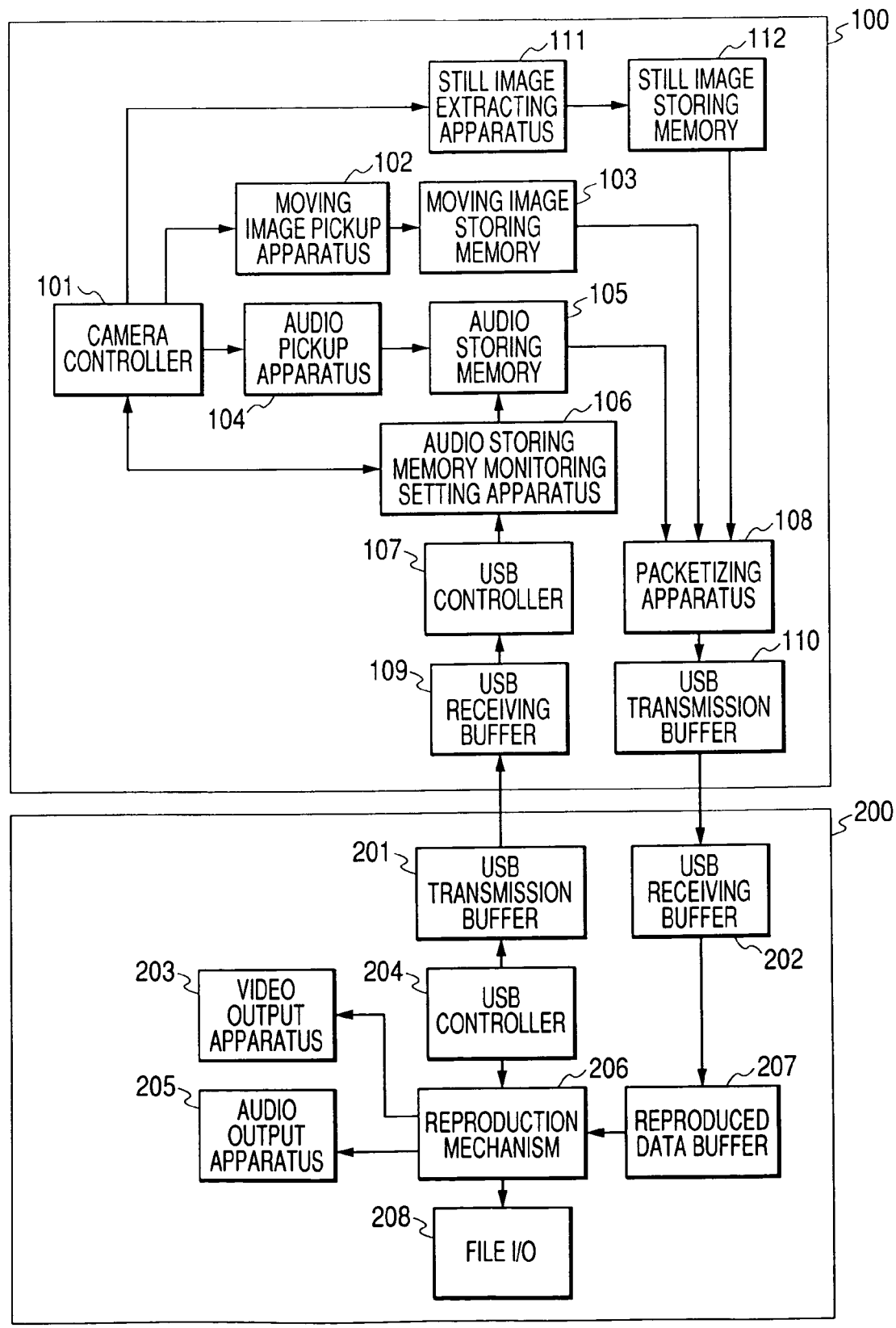
FIG. 6 is a block diagram showing a configuration of a digital video camera and a PC, to which the present invention is applied.

The configuration of the present embodiment is basically the same as the one of the first embodiment. The connection of the digital video camera and the USB host of the present embodiment is the one shown in FIG. 1, and the configuration of them is the one as shown in FIG. 6. Similarly to the first embodiment, the USB video class is used for the transfer of moving image data, and the USB audio class is used for the transfer of audio data.

In the USB video class used in the present embodiment, a function of getting an image as a still image into the PC 200 as the USB host at an arbitrary point of time during streaming in accordance with an instruction from the PC 200 is also defined.

For using the still image getting function, the digital video camera 100 of the present embodiment is equipped with a still image pickup apparatus 111 and a still image storing memory 112. The still image pickup apparatus 111 converts an object image into digital data in response to an instruction of the camera controller 101. Moreover, the still image storing memory 112 is for buffering still image data until the still image data is transferred to the packetizing apparatus 108.

An operation of getting a still image into the PC 200 is performed in accordance with the following procedure.

First, the getting operation of the still image is started by an instruction for getting a still image, provided by a user's operation of the reproduction mechanism 206 operating on the USB host (PC) 200. Then, a still image getting request is transmitted to the digital video camera 100 through the USB controller 204 and the USB transmission buffer 201. On the side of the digital video camera 100, the still image getting request is transmitted to the USB controller 107 through the USB receiving buffer 109.

The USB controller 107, which has received the still image getting request, issues a still image getting instruction to the camera controller 101 and reports the reception of the still image getting request to the audio storing memory monitoring setting apparatus 106 (the details thereof will be described later). The camera controller 101, which has received the still image getting request, outputs an instruction to the still image pickup apparatus 111 to generate still image data and delivers the still image data to the packetizing apparatus 108 through the still image storing memory 112. The packetizing apparatus 108 packetizes the still image data to store the packetized still image data into the USB transmission buffer 110 similarly to the cases of the moving image data and audio data.

The still image data stored in the USB transmission buffer 110 is transmitted to the USB host 200 to be further transmitted to the reproduction mechanism 206 through the USB receiving buffer 202 and the reproduced data buffer 207. When the reproduction mechanism 206 receives the still image data, the reproduction mechanism 206 outputs the received still image data to the video output apparatus 203 for a fixed period of time. Moreover, when the reproduction mechanism 206 gets the still image, the reproduction mechanism 206 uses a file I/O 208 provided in the USB host (PC) 200, to save the gotten still image as a file.

In the present embodiment, the reproduction mechanism 206 generates a shutter sound as an electronic sound at the time of the getting of the still image.

Because transferred audio data is discontinuous at the time of a correction of the data read-out position in the audio storing memory 105, an unpleasant sound such as a noise is sometimes generated in reproduced sounds.

For solving this problem, the present embodiment takes the following consideration. That is, the present embodiment performs the correction of the audio data read-out position at the timing of the generation of the shutter sound at the time of the getting of a still image to prevent the unpleasant sound from being heard by a user.

Figure 7:
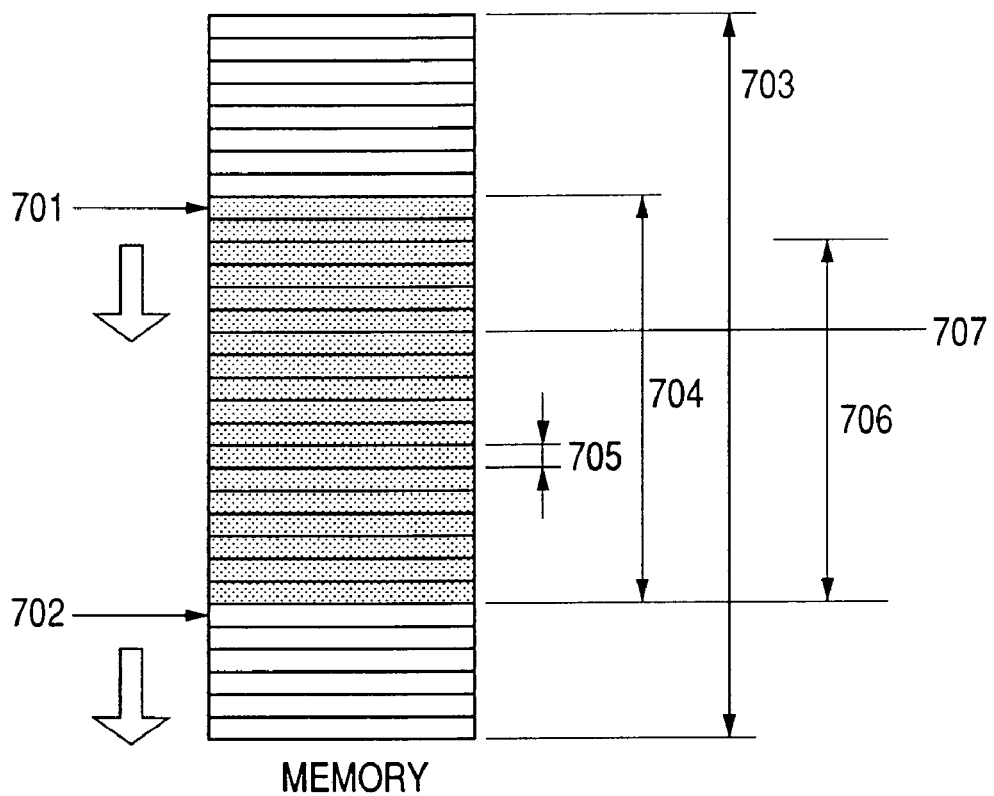
FIG. 7 is a view showing the state of the buffering of audio data.
Figure 8:
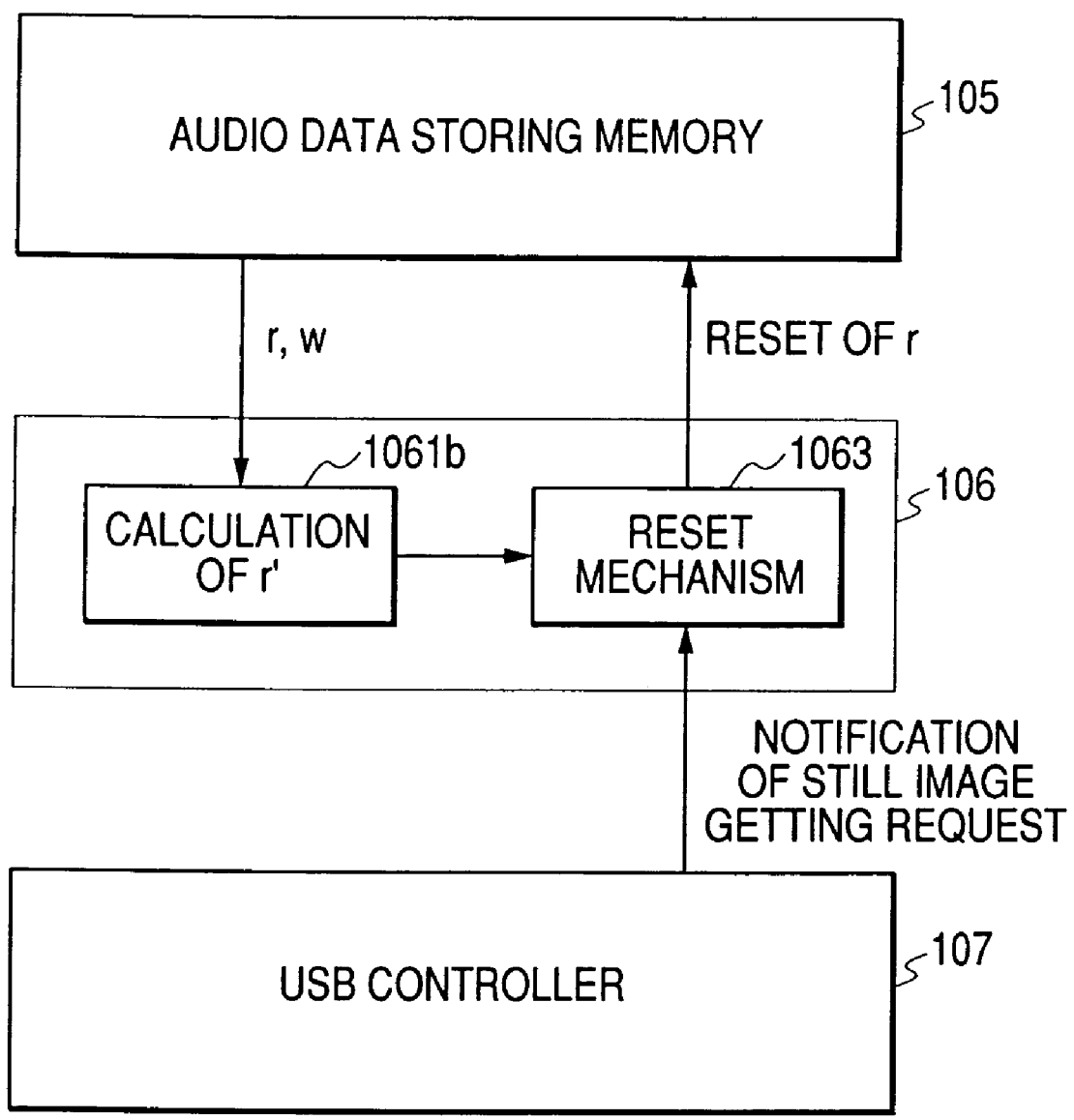
FIG. 8 is a view showing a configuration for the control of an audio storing memory.
Figure 9:
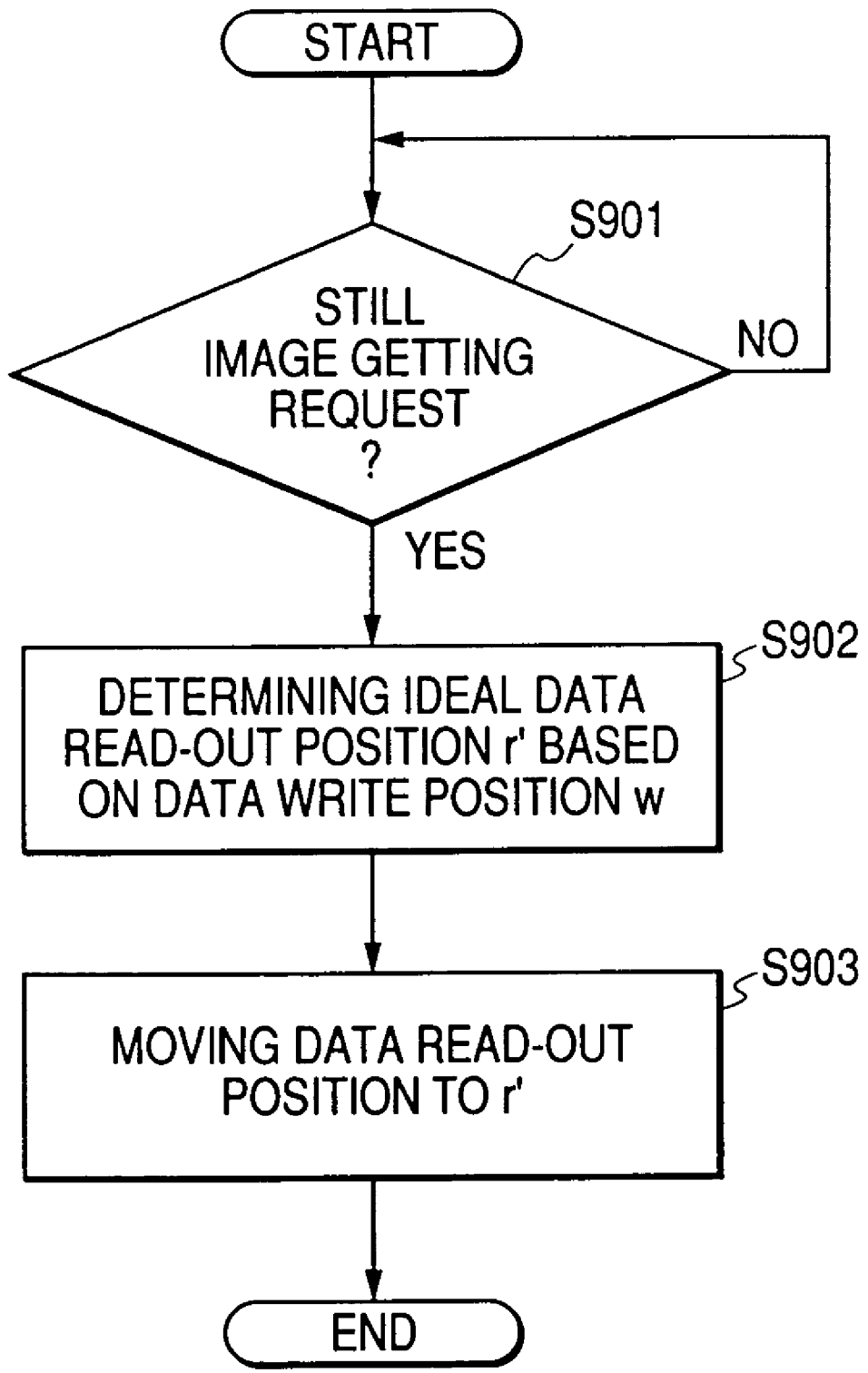
FIG. 9 is a flowchart showing the read-out control of audio data.

In the following, the operation of the audio storing memory monitoring setting apparatus 106 at the time of the getting of a still image will be described. Similarly to FIG. 3, FIG. 7 is a view showing a state of the audio storing memory 105. FIG. 8 is a view showing the configuration of the main part of the audio storing memory 105. FIG. 9 is a flowchart showing the operation of the audio storing memory monitoring setting apparatus 106.

When the USB controller 107, which has received a still image getting request, informs the audio storing memory monitoring setting apparatus 106 of the reception of the still image getting request (step S901), the audio storing memory monitoring setting apparatus 106 determines on the basis of the present data write position w, an ideal data read-out position r' of the case where only an ideal value a' of data amount to be subjected to buffering is buffered (step S902). Then, the audio storing memory monitoring setting apparatus 106 moves the data read-out position r to the determined ideal data read-out position r' (step S903).

Embodiment 3

Next, a third embodiment will be described.

The second embodiment enables the evasion of an unpleasant noise at the time of resetting by performing the resetting of the data read-out position of the audio storing memory by taking advantage of interruption of a streaming reproduction during the operation of getting a still image. The present embodiment minimizes the unpleasant feeling of a user owing to a noise by performing the resetting at the timing when the volume of a sound becomes smaller than a predetermined threshold value.

Figure 10:
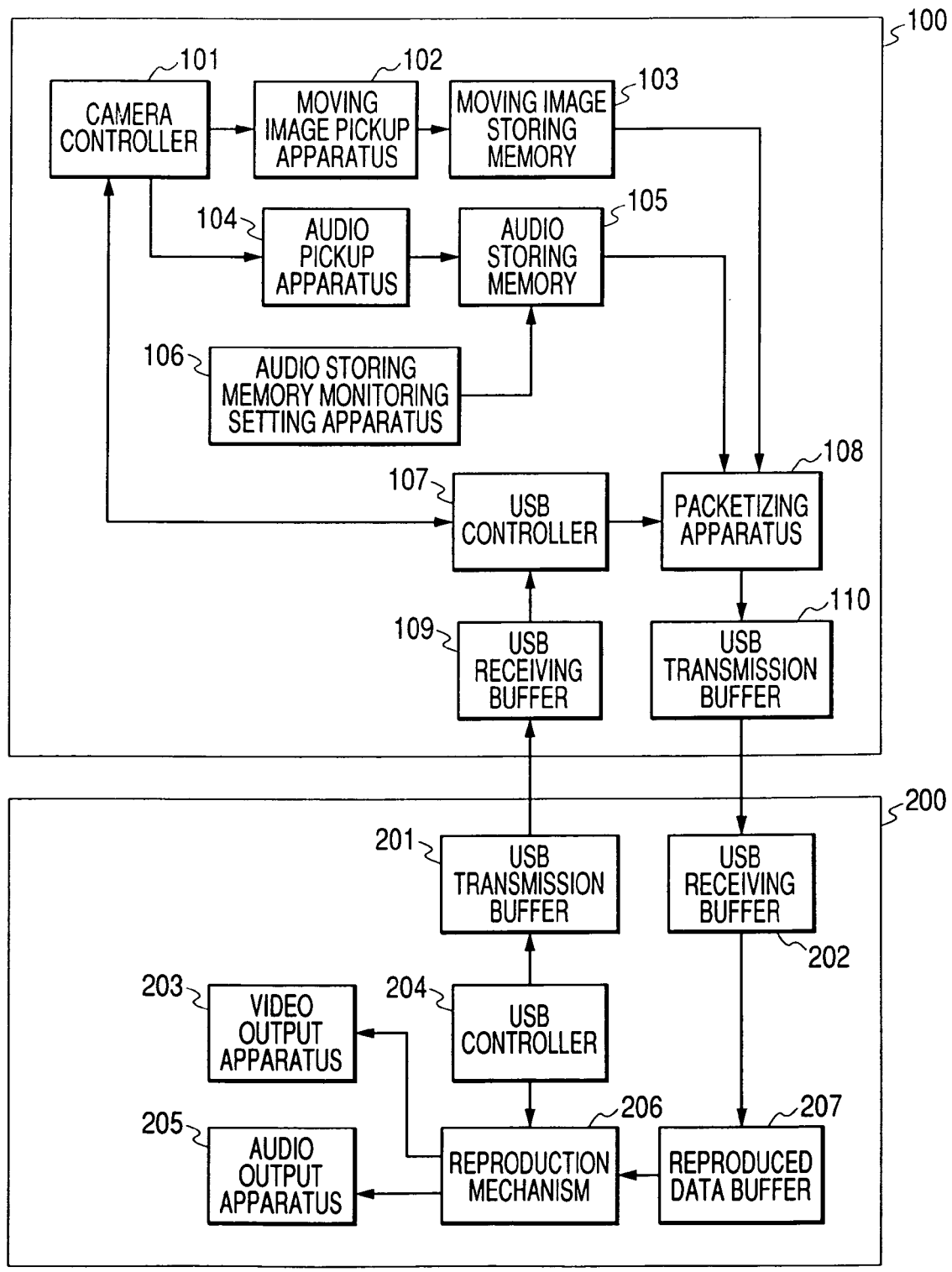
FIG. 10 is a block diagram showing a configuration of a digital video camera and a PC, to which the present invention is applied.

The configuration of the present embodiment is basically the same as the one of the first embodiment. The connection of the digital video camera and the USB host of the present embodiment is the one shown in FIG. 1, and the configuration of them is the one as shown in FIG. 10. Only different points from the first embodiment are described in the following.

Figure 11:
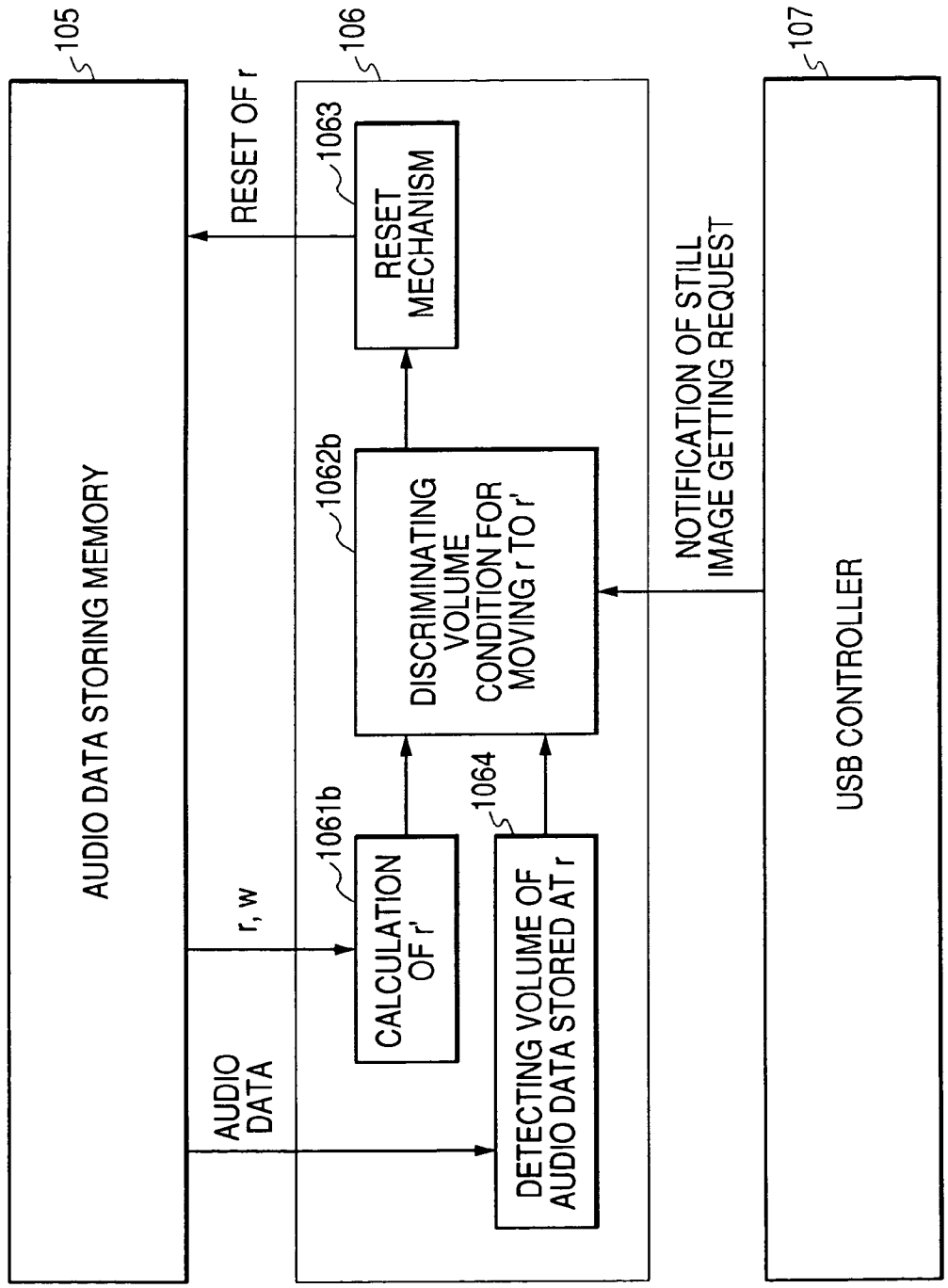
FIG. 11 is a view showing a configuration for the control of an audio storing memory.
Figure 12:
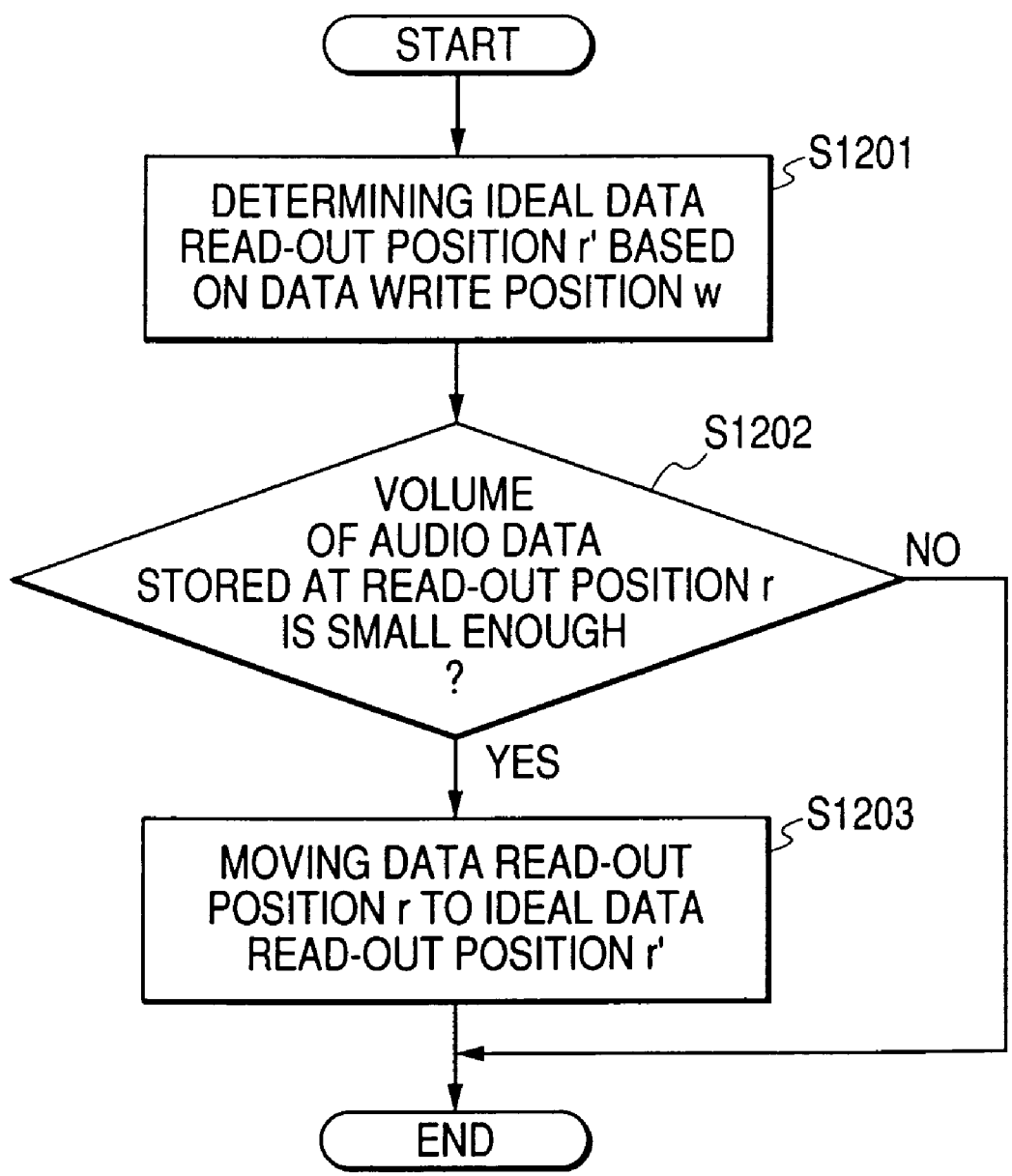
FIG. 12 is a flowchart showing the read-out control of audio data.

FIG. 11 is a view showing the configuration of the main part of the audio storing memory monitoring setting apparatus 106 of the present embodiment. FIG. 12 is a flowchart showing the processing of the audio storing memory monitoring setting apparatus 106. When the audio storing memory monitoring setting apparatus 106 is informed of a reception of a data transmission request from the USB controller 107, the audio storing memory monitoring setting apparatus 106 determines on the basis of the present data write position w, an ideal data read-out position r' of the case where only an ideal value a' of data amount to be subjected to buffering is buffered (step S1201). Next, the audio storing memory monitoring setting apparatus 106 judges whether the volume of audio data stored at the present data read-out position r is small enough or not (step S1202). When the volume is small enough, the audio storing memory monitoring setting apparatus 106 moves the data read-out position r to the determined ideal data read-out position r' (step S1203).

Embodiment 4

Next, a fourth embodiment will be described.

The fourth embodiment is based on the same idea as the one of the third embodiment. However, the position at which the audio data to be used for the judgment of whether the resetting of the data read-out position is performed or not is obtained differs from that of the third embodiment.

The configuration of the present embodiment is basically the same as the one of the third embodiment. The connection of the digital video camera and the USB host of the present embodiment is the one shown in FIG. 1, and the configuration of them is the one as shown in FIG. 10. Only different points from the third embodiment are described in the following.

Figure 13:
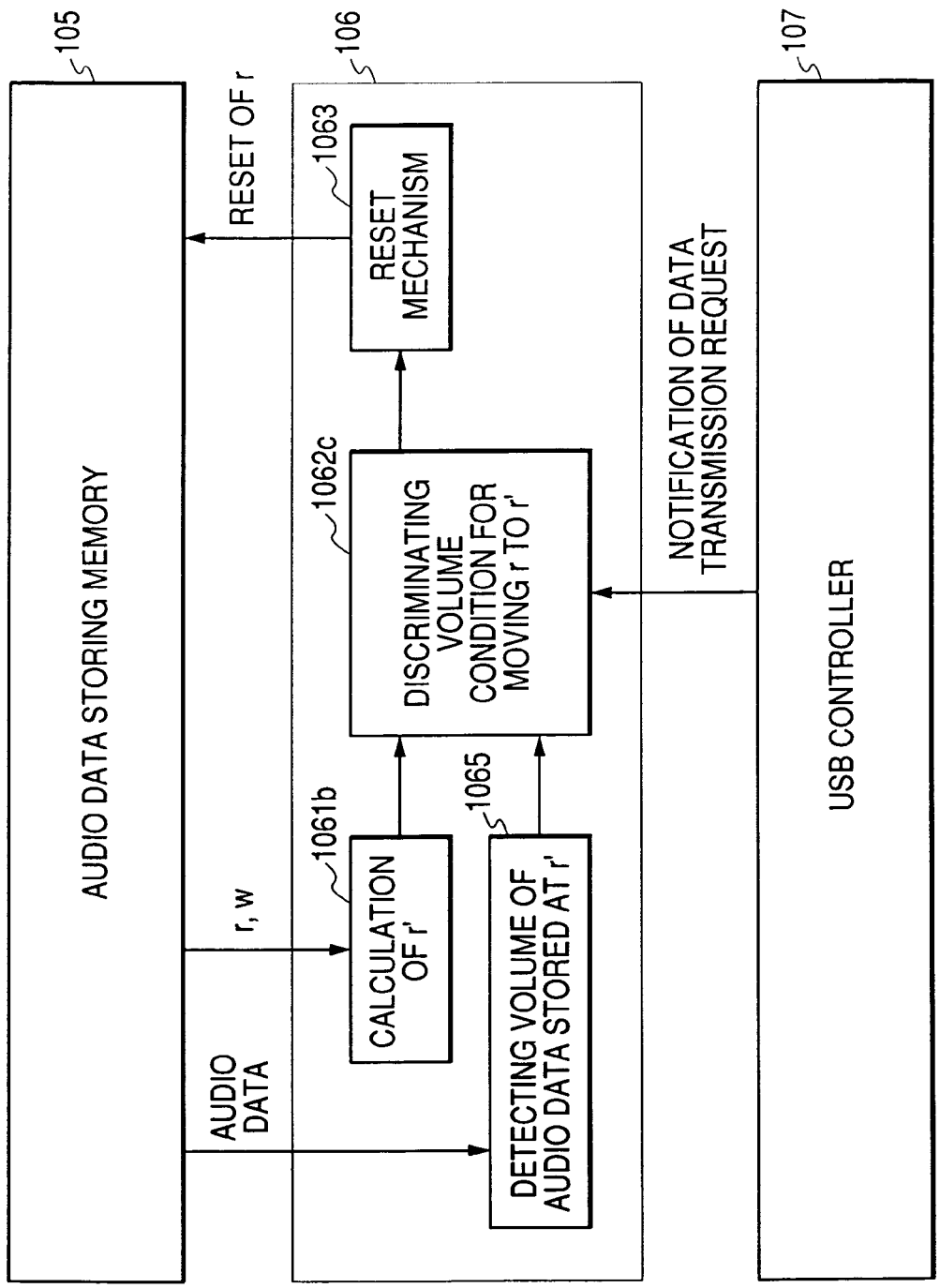
FIG. 13 is a view showing a configuration for the control of an audio storing memory.
Figure 14:
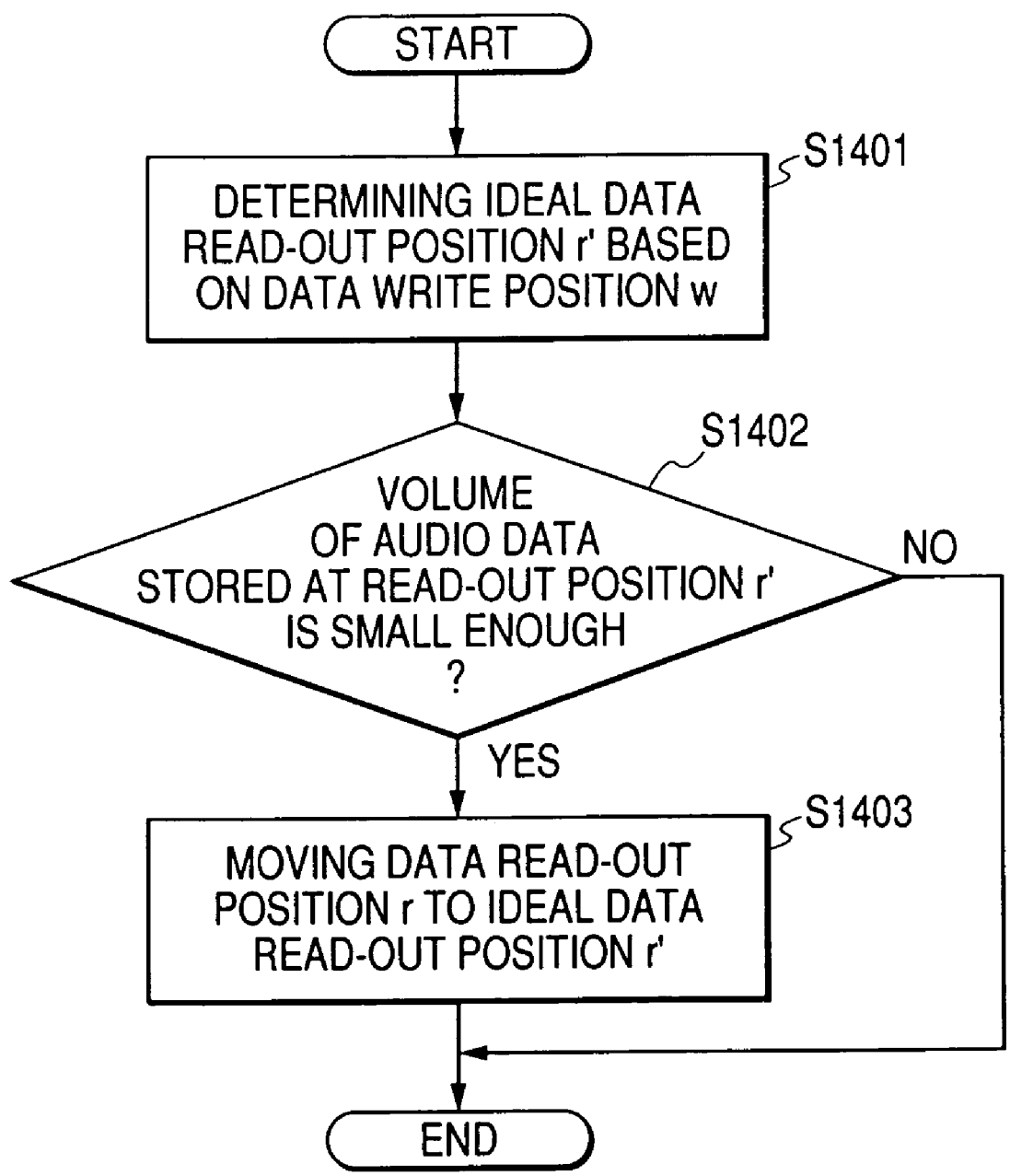
FIG. 14 is a flowchart showing the read-out control of audio data.

FIG. 13 is a view showing the configuration of the main part of the audio storing memory monitoring setting apparatus 106. FIG. 14 is a flowchart showing the processing of the audio storing memory monitoring setting apparatus 106.

When the audio storing memory monitoring setting apparatus 106 is informed of a reception of a data transmission request from the USB controller 107, the audio storing memory monitoring setting apparatus 106 determines an ideal data read-out position r' on the basis of the present data write position w (step S1401). Next, the audio storing memory monitoring setting apparatus 106 judges whether the volume of audio data stored at the ideal data read-out position r' is small enough or not (step S1402). When the audio storing memory monitoring setting apparatus 106 judges that the volume is small enough, the audio storing memory monitoring setting apparatus 106 moves the data read-out position r to the ideal data read-out position r' (step S1403).

Embodiment 5

Next, a fifth embodiment will be described.

The fifth embodiment obtains the audio data to be used for the judgment of whether the resetting of the data read-out position is performed or not from both of the present data read-out position r and the ideal data read-out position r'.

The configuration of the present embodiment is basically the same as the one of the third embodiment. The connection of the digital video camera and the USB host of the present embodiment is the one shown in FIG. 1, and the configuration of them is the one as shown in FIG. 10. Only different points from the third embodiment are described in the following.

Figure 15:
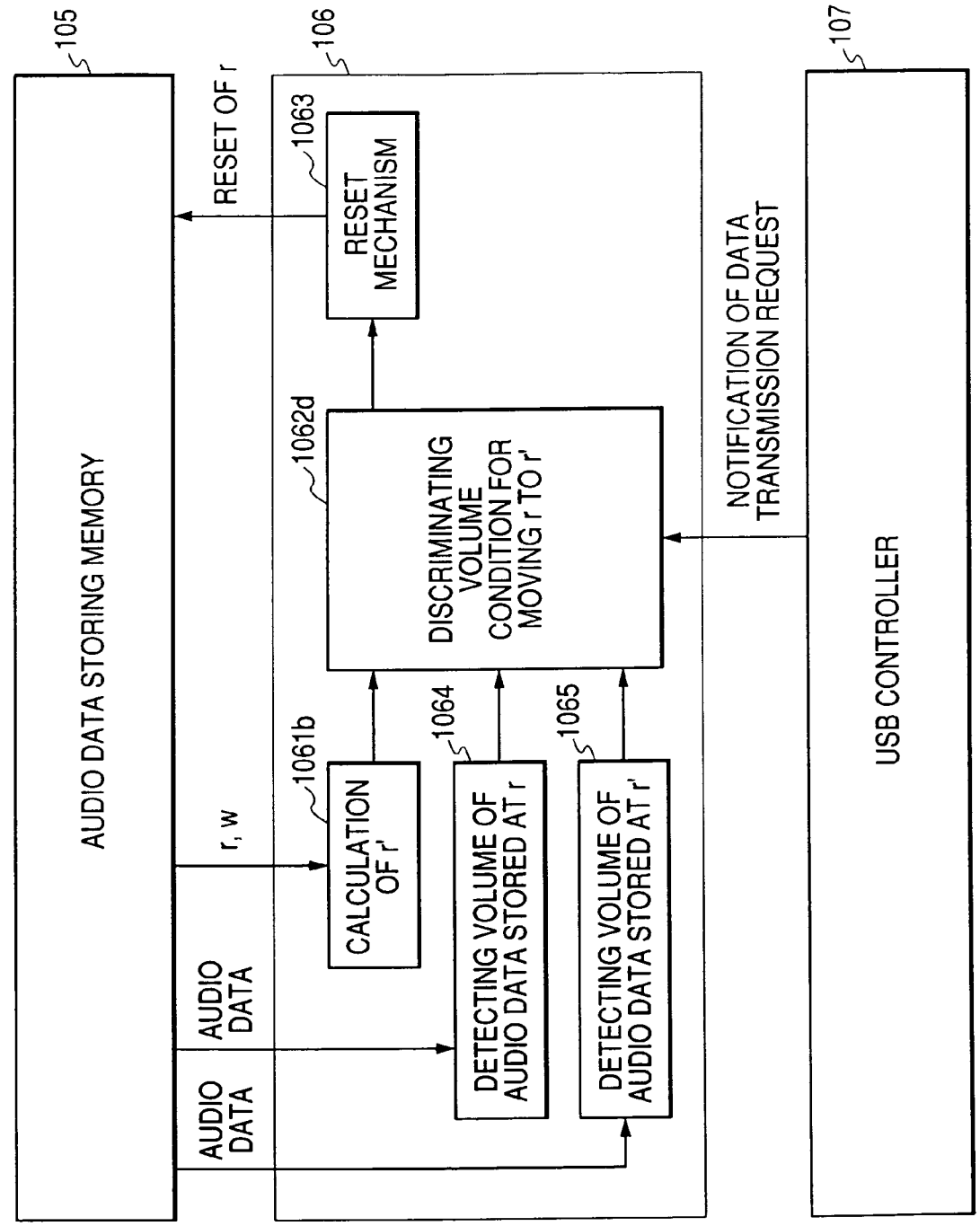
FIG. 15 is a view showing a configuration for the control of an audio storing memory.
Figure 16:
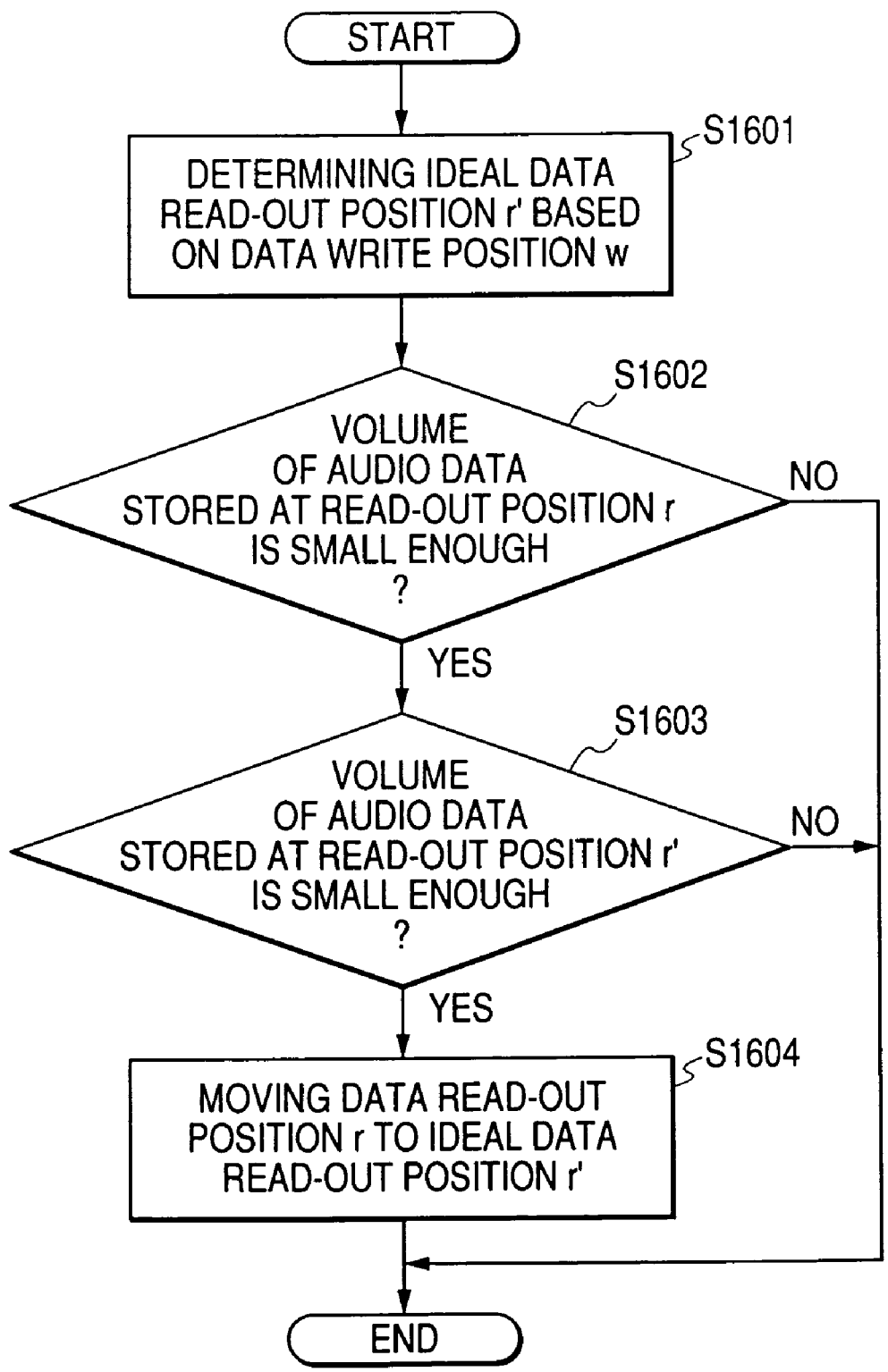
FIG. 16 is a flowchart showing the read-out control of audio data.

FIG. 15 is a view showing the configuration of the main part of the audio storing memory monitoring setting apparatus 106. FIG. 16 is a flowchart showing the processing of the audio storing memory monitoring setting apparatus 106.

When the audio storing memory monitoring setting apparatus 106 is informed of a reception of a data transmission request from the USB controller 107, the audio storing memory monitoring setting apparatus 106 determines an ideal data read-out position r' on the basis of the present data write position w (step S1601). Next, the audio storing memory monitoring setting apparatus 106 judges whether the volume of audio data stored at the present data read-out position r is small enough or not (step S1602). When the volume is small enough, the audio storing memory monitoring setting apparatus 106 further judges whether the volume of each audio data stored at the ideal data read-out position r' is small enough or not (step S1603). When the audio storing memory monitoring setting apparatus 106 judges that the volume is small enough at the step S1603, the audio storing memory monitoring setting apparatus 106 moves the data read-out position r to the ideal data read-out position r' (step S1604).

Embodiment 6

Next, a sixth embodiment will be described.

The second embodiment performs the resetting of the data read-out position of the audio storing memory by taking advantage of the interruption of a streaming reproduction during the operation of getting a still image. The present embodiment forcibly performs the resetting of the data read-out position at every fixed period of time by means of a timer.

Figure 17:
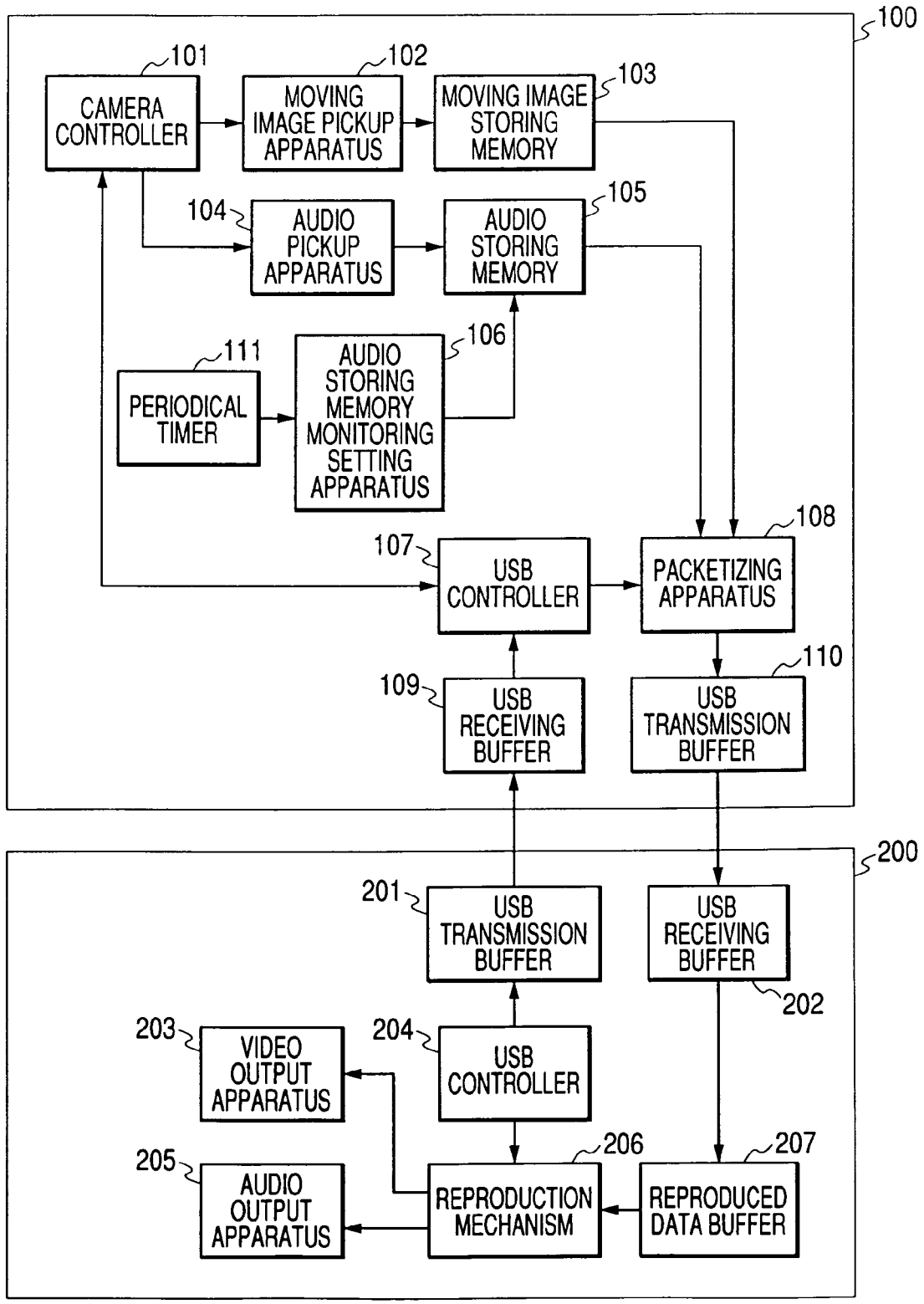
FIG. 17 is a block diagram showing a configuration of a digital video camera and a PC, to which the present invention is applied.

The configuration of the present embodiment is basically the same as the one of the first embodiment. The connection of the digital video camera and the USB host of the present embodiment is the one shown in FIG. 1, and the configuration of them is the one as shown in FIG. 17. Only different points from the first embodiment are described in the following.

Even when the USB controller 107 receives a data transmission request, the USB controller 107 does not inform the audio storing memory monitoring setting apparatus 106 of the fact of the reception. The digital video camera 100 includes a timer 111. The timer 111 outputs a timing signal to the audio storing memory monitoring setting apparatus 106 at every fixed period of time.

When the audio storing memory monitoring setting apparatus 106 receives a timing signal from the timer 111, the audio storing memory monitoring setting apparatus 106 controls the read-out position of the audio storing memory 105 as follows.

Figure 18:
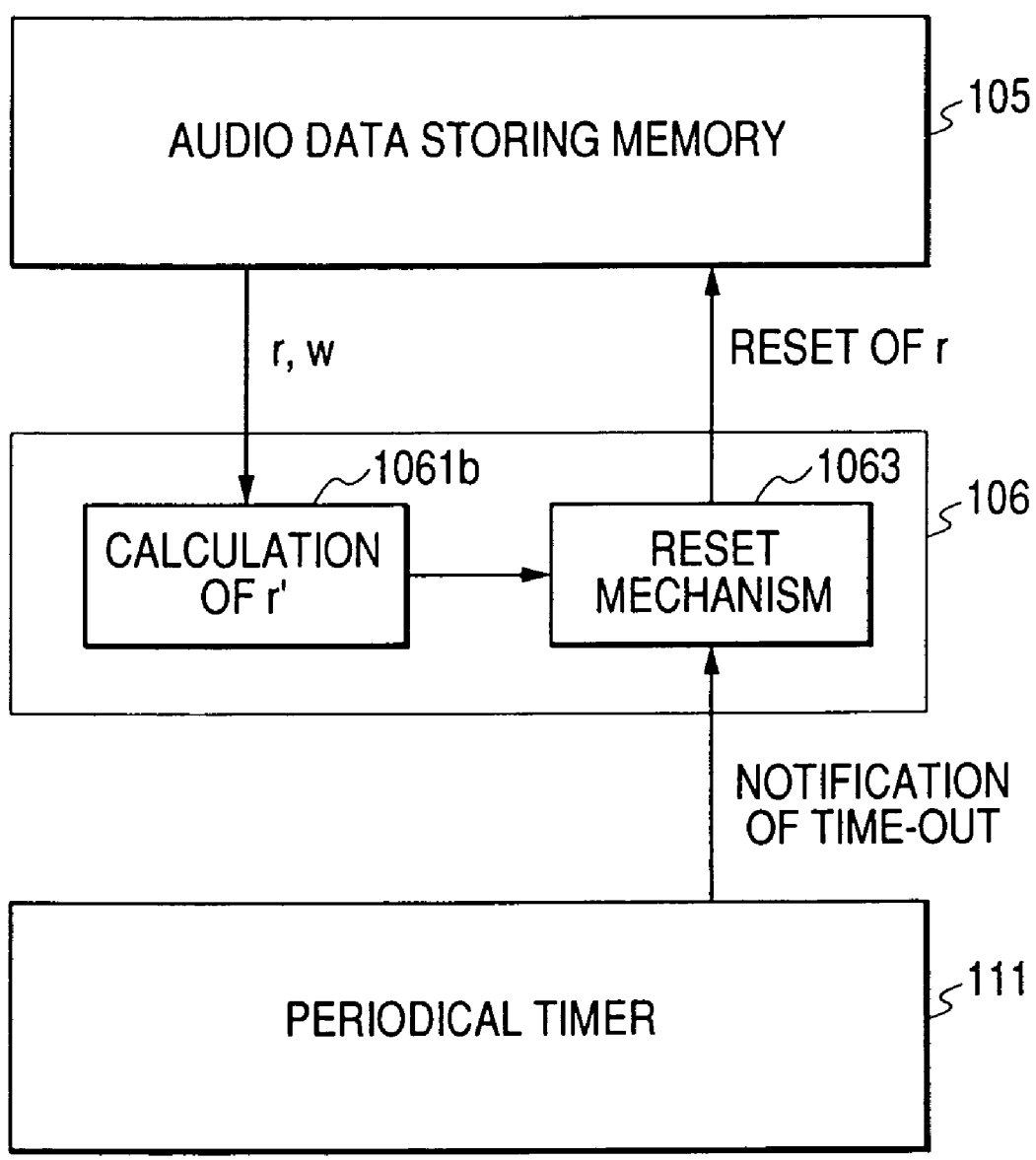
FIG. 18 is a view showing a configuration for the control of an audio storing memory.
Figure 19:
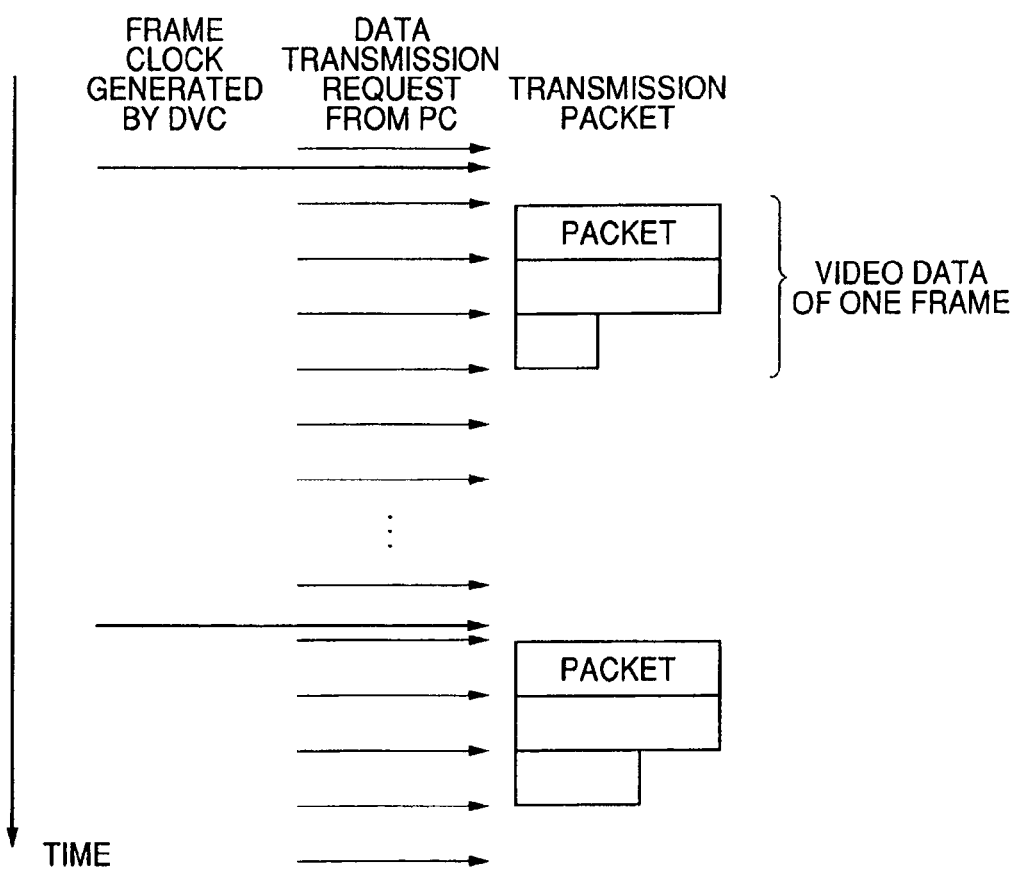
FIG. 19 is a view showing a state of transmission of audio data and image data.

FIG. 18 is a view showing the configuration of the main part of the audio storing memory monitoring setting apparatus 106 of the present embodiment. When the audio storing memory monitoring apparatus 106 receives a timing signal, the audio storing memory monitoring setting apparatus 106 determines an ideal data read-out position r' on the basis of the present data write position w, and the audio storing memory monitoring setting apparatus 106 moves the data read-out position r to the ideal data read-out position r'.

According to each embodiment described above, a synchronous deviation between audio data and moving image data generated at streaming of a sound and a moving image can be corrected without using any complicated circuits.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing apparatus comprising:
   an input unit adapted to input an audio signal;
   a buffer unit adapted to buffer the audio signal input by said input unit;
   a write controller adapted to write the audio signal into said buffer memory in accordance with a first timing signal;
   a communication unit adapted to read out the audio signal from said buffer memory in accordance with a second timing signal having a frequency different from that of the first timing signal, and transmit the read-out audio signal to an external device through a transmission path;
   a detector adapted to detect whether the volume of sound of the audio signal read out from said buffer memory becomes smaller than a predetermined threshold value or not;
   a read-out controller adapted to change a read-out position of the audio signal in said buffer memory to a determined position in accordance with said detector detecting that the volume of sound of the audio signal read out from said buffer memory becomes smaller than the predetermined threshold value, wherein said read-out controller determines the determined position based on a write position of the audio signal in said buffer memory, controlled by said write controller, and an ideal amount of the audio signal to be buffered in said buffer memory at a time when said communication unit starts reading out the audio signal from said buffer memory.

2. An apparatus according to claim 1, wherein
   said communication unit transmits the audio signal in accordance with a USB standard, and transmits the audio signal in accordance with a USB audio class.

3. An apparatus according to claim 1, wherein
the second timing signal is supplied from said external device.

4. An apparatus according to claim 3, further comprising a receiving unit adapted to receive the second timing signal through said transmission path.

5. An apparatus according to claim 1, wherein
said read-out controller changes the read-out position of the audio signal to a position which is after from the write position of the audio signal in said buffer memory by the amount of the data stored in said buffer memory at the time when said communication unit starts reading out the audio signal from said buffer memory.

6. A video camera for transmitting a moving image signal and an audio signal to a host apparatus in accordance with a USB standard, comprising:
imaging means for photographing an object;
a microphone for picking up an audio signal related to the object;
a moving image memory for storing the moving image signal obtained by said imaging means;
an audio memory for storing the audio signal picked up by said microphone;
write control means for writing the moving image signal into said moving image memory in accordance with a first timing signal and writing the audio signal into said audio memory in accordance with the first timing signal;
communication means for reading out the moving image signal from said moving image memory in accordance with the first timing signal to transmit the read-out moving image signal to said host apparatus in accordance with a USB video class and reading out the audio signal from said audio memory in accordance with a second timing signal supplied from said host apparatus to transmit the read-out audio signal to the host apparatus in accordance with a USB audio class;
detecting means for detecting whether the volume of sound of the audio signal read out from said buffer memory becomes smaller than a predetermined threshold value or not;
read-out control means for changing a read-out position of the audio signal in said audio memory to a predetermined position in accordance with said detecting means detecting that the volume of sound of the audio signal read out from said buffer memory becomes smaller than the predetermined threshold value, wherein said read-out control means determines the determined position based on a write position of the audio signal in said audio memory and an ideal amount of data to be stored in said audio memory at a time when said communication means starts reading out the moving image signal from said moving image memory.

7. A signal processing apparatus comprising:
an input unit adapted to input an audio signal;
a buffer memory adapted to buffer the audio signal input by said input unit;
a write controller adapted to writing the audio signal into said buffer memory in accordance with a first timing signal;
a communication unit adapted to read out the audio signal from said buffer memory in accordance with a second timing signal having a frequency different from that of the first timing signal, and transmit the read-out audio signal to an external device through a transmission path;
a detector adapted to detect whether the volume of sound of the audio signal read out from a determined position of the buffer memory becomes smaller than a predetermined threshold value or not; and
a read-out controller adapted to change a read-out position of the audio signal in said buffer memory to the determined position of the buffer memory in accordance with said detector detecting that the volume of sound of the audio signal read out from the determined position is smaller than a predetermined threshold value, wherein the determined position is determined based on a write position of the audio signal in said buffer memory, controlled by said write controller, and an ideal amount of audio signal to be buffered in said buffer memory at a time when said communication unit starts reading out the audio signal from said buffer memory.

8. An apparatus according to claim 7, wherein
said communication unit transmits the audio signal in accordance with a USB standard and transmits the audio signal in accordance with a USB audio class.

9. An apparatus according to claim 7, wherein
the second timing signal is supplied from said external device.

10. An apparatus according to claim 9, further comprising a receiving unit adapted to receive the second timing signal through said transmission path.

11. An apparatus according to claim 7, wherein
said read-out controller changes the read-out position of the audio signal to a position which is after from the write position of the audio signal in said buffer memory by the amount of the data stored in said buffer memory at the time when said communication unit starts reading out the audio signal from said buffer memory.

12. A video camera for transmitting a moving image signal and an audio signal to a host apparatus in accordance with a USB standard, comprising:
imaging means for photographing an object;
a microphone for picking up an audio signal related to the object;
a moving image memory for storing the moving image signal obtained by said imaging means;
an audio memory for storing the audio signal picked up by said microphone;
a write control means for writing the moving image signal into said moving image memory in accordance with a first timing signal and writing the audio signal into said audio memory in accordance with the first timing signal;
communication means for reading out the moving image signal from said moving image memory in accordance with the first timing signal to transmit the read-out moving image signal to said host apparatus in accordance with a USB video class and reading out the audio signal from said audio memory in accordance with a second timing signal supplied from said host apparatus to transmit the read-out audio signal to the host apparatus in accordance with a USB audio class;
detecting means for detecting whether the volume of sound of the audio signal read out from a determined position of the audio memory becomes smaller than a predetermined threshold value or not; and
read-out control means for changing a read-out position of the audio signal in said audio memory to the determined position of the buffer memory in accordance with said detecting means detecting that the volume of sound of the audio signal read out from the determined position in the audio memory is smaller than the predetermined threshold value, wherein said read-out control means determines the determined position based on a write position of the audio signal in said audio memory and an ideal amount of data to be stored in said audio memory at a time when said communication means starts reading out the moving image signal from said moving image memory.

* * * * *